United States Patent [19]

Park

[11] Patent Number: 5,323,281
[45] Date of Patent: Jun. 21, 1994

[54] CASSETTE HOLDER OF A TAPE RECORDER

[75] Inventor: Byung Y. Park, Suweon-city, Rep. of Korea

[73] Assignee: Samsung Electronics Co. Ltd., Kyungki-do, Rep. of Korea

[21] Appl. No.: 825,114

[22] Filed: Jan. 24, 1992

[30] Foreign Application Priority Data

Jan. 30, 1991 [KR] Rep. of Korea ............... 91-1587

[51] Int. Cl.$^5$ ............................................. G11B 15/60
[52] U.S. Cl. ................................................ 360/96.5
[58] Field of Search ............... 360/96.5, 96.6, 99.02, 360/99.06, 96.1; 369/77.2

[56] References Cited

U.S. PATENT DOCUMENTS

| | | | |
|---|---|---|---|
| 4,405,962 | 9/1983 | Haruta | 360/96.6 |
| 4,817,079 | 3/1989 | Covington | 369/77.2 |
| 4,914,647 | 4/1990 | Ono et al. | 369/77.2 |

*Primary Examiner*—Stuart S. Levy
*Assistant Examiner*—Paul J. Ditmyer
*Attorney, Agent, or Firm*—Robert E. Bushnell

[57] ABSTRACT

A cassette holder of a tape recorder having a cassette loading mechanism includes at least two spring pressure applying members which press the right and left top surface portions of a cassette. Also, the two spring pressure applying members are arranged such that each of the action points of the two spring pressure applying members is distanced apart from each other by predetermined intervals against an inserting direction of the cassette, so that the inserting and drawing out of the cassette are smoothly executed, and also a rolling is eliminated in a mounting state of the cassette, due to the fact that two axes of the lateral axis lines are provided.

11 Claims, 3 Drawing Sheets

CASSETTE HOLDER OF A TAPE RECORDER

The present invention relates to a cassette holder of a tape recorder having a cassette loading mechanism, and more particularly, to a cassette holder for a tape recorder in which a cassette is inserted into the cassette holder from the outside, and prevented from rolling upon reaching a safe arrival state.

BACKGROUND OF THE INVENTION

A tape recorder, e.g., a digital audio tape recorder or a video recorder, has a cassette loading mechanism. In such a tape cassette recorder, when a cassette is inserted into the cassette holder and received therein, the cassette holder is automatically operated so that the loading/unloading operation of the cassette is executed. At this time, when a cassette receiving state of the cassette holder is loose, a slipping away of the cassette according to the backlash at a point in time of a loading start occurs, and, on the contrary, when the cassette's receiving state is tight, the inserting and the drawing out of the cassette is not performed smoothly. Accordingly, the cassette holder requires a pressure applying member for pressing and supporting the cassette with a predetermined pressure.

Conventional problems will be described hereinafter with reference to the cassette holder which is used in a digital audio tape recorder.

Heretofore, as shown in FIG. 1, an article has been used in which a pair of leaf springs 12a, 12b are arranged in a state aligned to a front and rearward direction and each of the leaf springs 12a, 12b are respectively fixed at one end by screws 13a, 13b, and rollers 14a, 14b are respectively attached to the other end of each of the leaf springs 12a, 12b. That is, a top surface of the cassette 15 is contacted with the rollers 14a,14b and thereby pressed with a resilient force of the leaf springs 12a, 12b, so that the problem of backlash, as already known, is eliminated.

However, since each position of the two rollers 14a, 14b the two rollers 14a, 14b being the points of actuation of the leaf springs 12a, 12b are aligned on one lateral axis line y in a direction of right and left as seen in FIG. 1, the contact or the release of the two rollers 14a, 14b are simultaneously carried out upon the insertion and ejection of the cassette 15.

Accordingly, there has been a problem that the inserting and the drawing out of the cassette 15 are not smoothly executed and a noise is made at a moment when its contact or release is made, and a rolling of the cassette occurs around the lateral axis line in a mounting state of the cassette so that a vibration of the tape occurs.

SUMMARY OF THE INVENTION

The present invention is made to solve the above-described conventional problems, and an object of the present invention is to provide a cassette holder of a tape recorder which is made such that two spring pressure applying members are arranged to be distanced apart by a predetermined distance so as to sequentially press on the cassette 15, so that the inserting and the drawing out of the cassette 15 are smoothly executed. Thereby the noise is decreased, and also a rolling is eliminated in a mounting state of the cassette thus preventing a vibration of the tape, so that a sound quality or a picture quality is improved.

In order to achieve the above-described objects, the present invention is characterized by a cassette holder of a tape recorder having least two spring pressure applying members for pressing the right and left top surface portions of a cassette that is inserted from the front of the cassette holder, the two spring pressure applying members being arranged such that each of the action points of the two spring pressure applying members is distanced apart from each other by predetermined intervals against an insertion direction of the cassette, so that when inserting the cassette, the top surface portions of the right and left sides of the cassette are made to be sequentially pressed, respectively, by the spring pressure applying members.

DESCRIPTION OF THE PREFERRED EMBODIMENT

Now, a preferred embodiment of the cassette holder of a tape recorder according to the present invention will be described in detail with reference to the accompanying drawings hereinafter.

Figure 2:
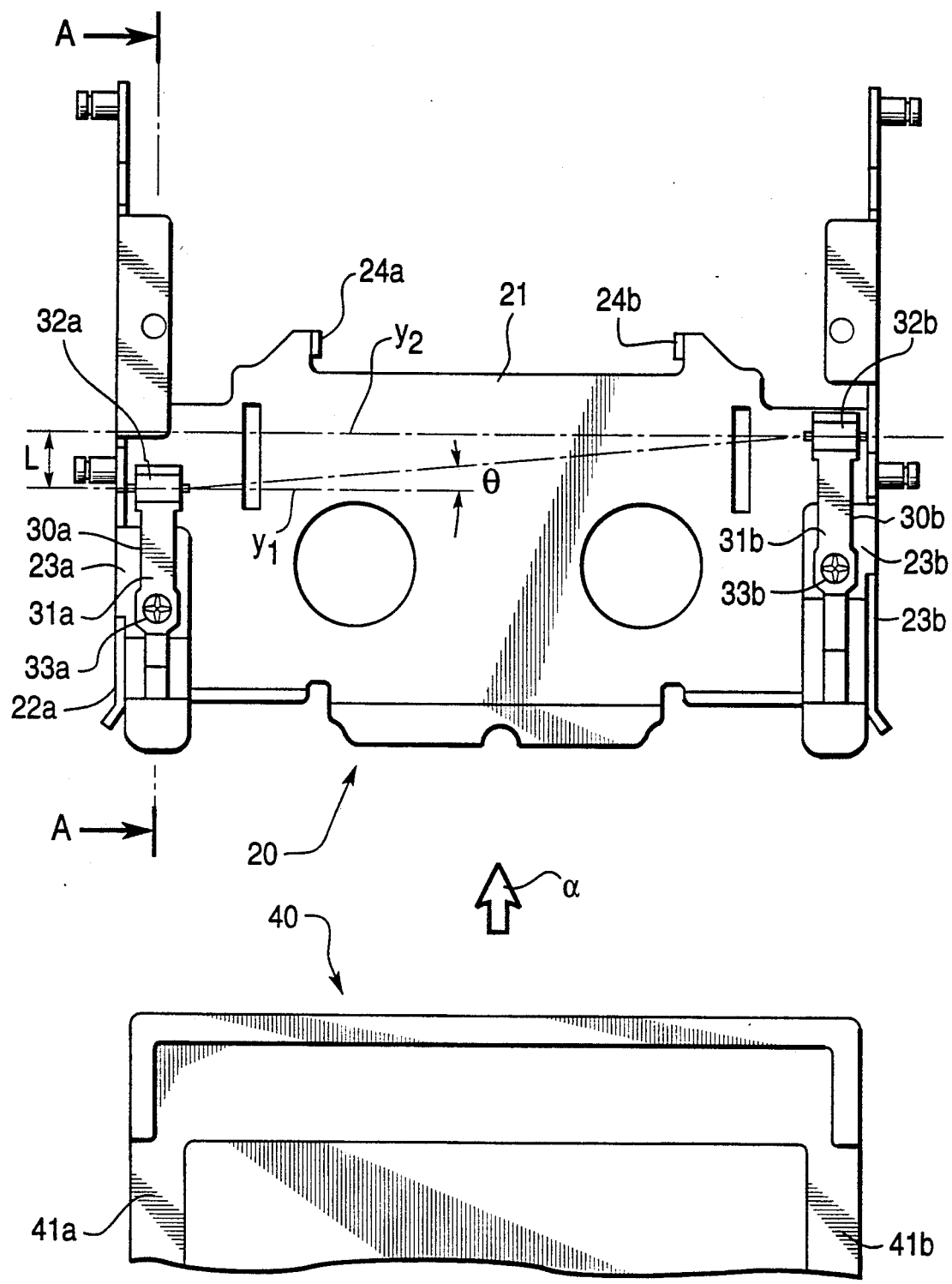
FIG. 2 is a plane view which shows a cassette holder according to a preferred embodiment of the present invention.
Figure 3:
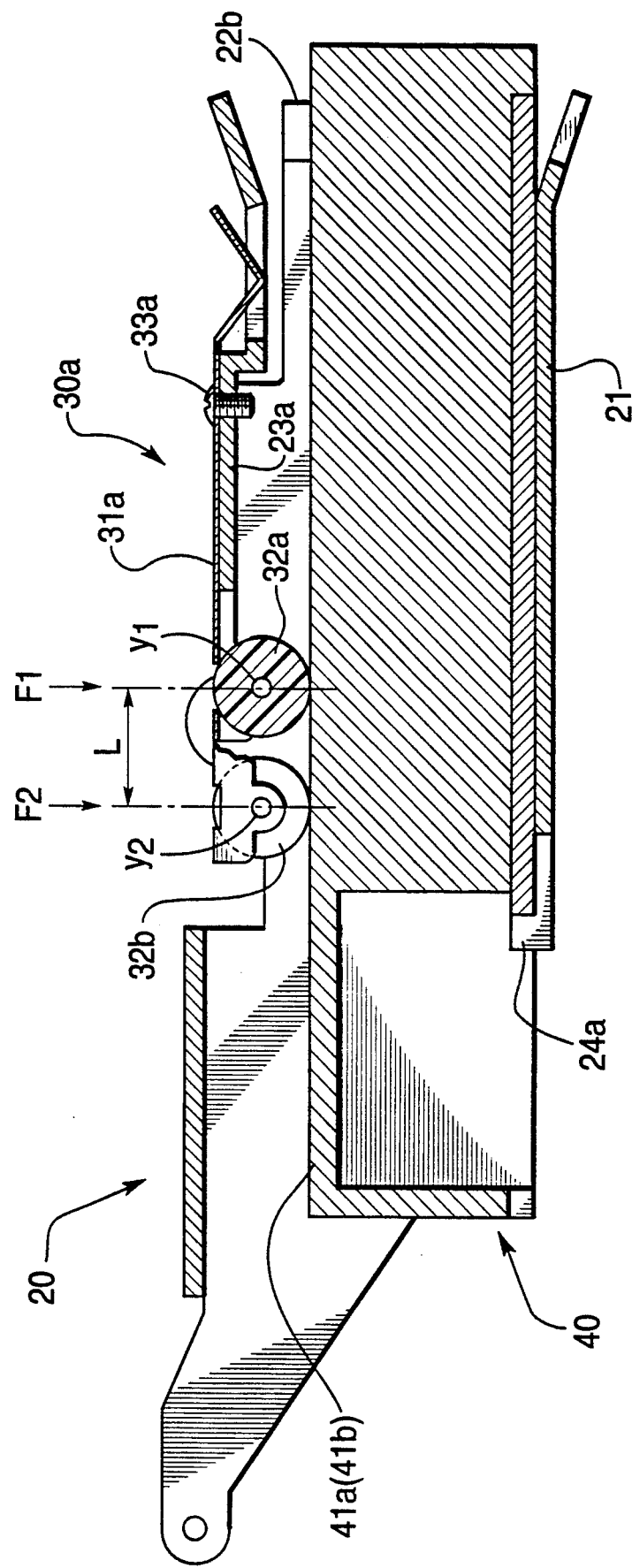
FIG. 3 is a cross sectional view which is taken along an A—A line of FIG. 2.

First, FIGS. 2 and 3 are diagrams which show a preferred embodiment of the cassette holder of a tape recorder according to the present invention.

In the FIG. 2, a reference numeral 20 denotes an entire body of a cassette holder used for a digital audio tape recorder, and the cassette holder 20 comprises a lower plate 21, left and right side plates 22a, 22b, and left and right side upper plates 23a,23b, and stoppers 24a, 24b which are formed respectively to the lower plate 21.

Reference numerals 30a,30b denote respectively spring pressure applying members, and the spring pressure applying members 30a,30b comprise leaf springs 31a,31b and pressing rollers 32a,32b, and the leaf springs 31a,31b are respectively fixed to the left and right side upper plates 23a,23b of the cassette holder 20 by screws 33a, 33b.

At this moment, the spring pressure applying members 30a,30b are respectively arranged, as shown in FIG. 2, on different lateral axis lines y1, y2, making a predetermined interval L against the inserting direction of the cassette 40 shown by arrow a, and making a predetermined inclined angle against $\theta$ the lateral axis lines y1, y2.

A reference numeral 40 is a cassette for a digital audio tape recorder, and the cassette 40 is inserted in a direction of the arrow a until it is stopped by stoppers 24a,24b of the cassette holder 20, and the cassette 40 is so received that its left and right top surface portions 41a, 41b are pressed by the pressing rollers 32a, 32b of the spring pressure applying members 30a, 30b.

As described above, in accordance with the cassette holder of the tape recorder according to the present invention, the resilient forces of the leaf springs 31a,31b of the spring pressure applying members 30a,30b are respectively applied to the left and right side top surface portions 41a,41b through the pressing rollers 32a,32b, and the positions of the pressing rollers 32a,32b become the action points of the spring pressure applying members 30a, 30b.

Figure 1:
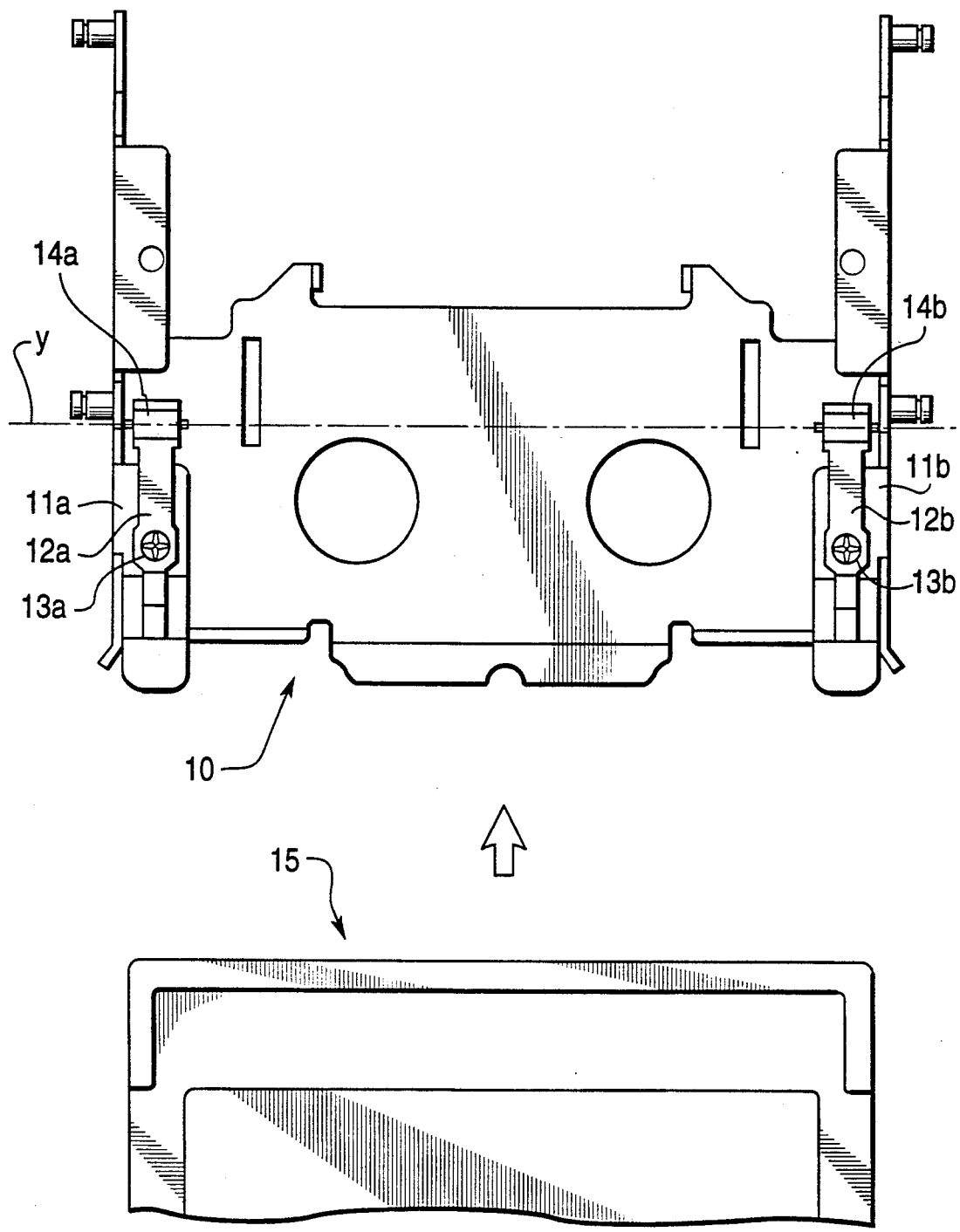
FIG. 1 is a plane view which shows a conventional cassette holder.

However, the positions of the pressing rollers 32a,32b, different from the positions of the rollers 14a, 14b of the conventional cassette holder 10 as shown in FIG. 1, are located on each of two lateral axis lines y1, y2 distanced apart by a predetermined interval L, and disposed so as to make an inclined angle against the lateral axis lines y1, y2. When the cassette 40 is inserted into the cassette holder 20, the left side top surface portion 41a of the cassette 40 is first pressed by the pressing roller 32a of the spring pressure applying member 30a located at the left side upper plate 23a, and next, the right side top surface portion 41b is pressed by the pressing roller 32b of the spring pressure applying member 30b located at the right side upper plate 23b.

That is, the right and left side top surface portions 41a, 41b of the cassette 40 are sequentially pressed, and the pressed state is sequentially released in time when drawing out the cassette 40, thereby sequentially dividing the instantaneous contact resistance, thus causing, the inserting and drawing out of the cassette to be carried out more smoothly.

And, as shown in FIG. 3, the top surface portions 41a, 41b of the cassette received within the cassette holder 20, are respectively pressed with forces of F1, F2 by the pressing roller 32a, 32b distanced apart with a predetermined interval L in a direction of front and rear (right and left in FIG. 3). That is, because two axes of the lateral axis lines y1, y2 are provided, there is no worry about producing the rolling against the two axes. Accordingly, a vibration of the tape is prevented because the rolling is eliminated in the mounting state of the cassette.

As described above, the cassette holder of the tape recorder according to the present invention provides an effect that a sound quality or a picture quality is improved because the inserting and drawing out of the cassette is smoothly executed, thereby decreasing the noise resulting from its inserting and drawing out, and the vibration of the tape due to the rolling of the cassette in a mounting state of the cassette is prevented.

What is claimed is:

1. A cassette holder of a tape recorder, comprising at least two spring pressure applying members disposed to press opposing top surface portions of a cassette inserted into the cassette holder, with a front side of the cassette for exposing a recording medium facing an inserting direction of the cassette, and said two spring pressure applying members arranged such that points of contact between the opposing top surface portions are spaced apart by a width of said front side of the cassette and said two spring pressure applying members are spaced apart from each other by a fixed distance along said inserting direction of the cassette, such that when the cassette is inserted, said opposing top surface portions of the cassette are sequentially pressed by said spring pressure applying members, said spring pressure members creating said points of contact to minimize vibration of said recording medium within said cassette holder.

2. A cassette holder of a tape recorder, for receiving and ejecting a cassette having a front side for exposing a recording medium, said front side facing an inserting direction of said cassette into said cassette holder, said cassette holder comprising:

lower plate means for supporting the cassette;

upper plate means for providing an upper guide for the cassette;

first resilient means attached to said upper plate means, disposed to press and contact a first side of a surface of the cassette at a first contact point, to provide pressure to said first side of said surface of the cassette; and second resilient means attached to said upper plate means, disposed to press and contact a second side of said surface of the cassette at a second contact point, to provide pressure to a second side of said surface of the cassette, said second side of said surface of said cassette and said first side of said surface of said cassette being spaced apart by a width of said front side of said cassette;

said first contact point being spaced apart by a fixed distance from said second contact point along said inserting direction of said cassette, said first resilient means and said second resilient means creating said first contact point and said second contact point to minimize vibration of said recording medium within said cassette holder.

3. The cassette holder as claimed in claim 2, wherein each of said first and second resilient means comprises:

a leaf spring attached at a first end to said upper plate means, for applying a force to said surface of the cassette;

a pressing roller attached to a second end of said leaf spring, for contacting said surface of the cassette.

4. The cassette holder as claimed in claim 3, wherein said upper plate means comprises:

first plate means for providing said upper guide to the cassette, and for supporting said first resilient means; and second plate means for providing said upper guide to the cassette, and for supporting said second resilient means.

5. The cassette holder as claimed in claim 4, further comprising:

stopping means attached to said lower plate means, for ceasing motion of the cassette upon insertion of the cassette into said cassette holder.

6. The cassette holder as claimed in claim 2, wherein said upper plate means comprises:

first plate means for providing said upper guide to the cassette, and for supporting said first resilient means; and second plate means for providing said upper guide to the cassette, and for supporting said second resilient means.

7. A cassette holder of a tape recorder, for receiving and ejecting a cassette having a front side for exposing a recording medium facing a direction of insertion of the cassette into the cassette holder, said cassette holder comprising:

first plate means for supporting the cassette;

second plate means for providing a guide for the cassette;

first resilient means attached to said second plate means, disposed to contact and press on a first side of a surface of the cassette to force the cassette against said first plate means; and second resilient means attached to said second plate means, spaced apart from said first resilient means by a fixed distance along said insertion direction of the cassette to contact and press on a second side of a surface of the cassette subsequent in time to said pressing on said first side of said surface of the cassette by said first resilient means, during insertion of the cassette into said cassette holder, to force the cassette against said first plate means, said first resilient means and said second resilient means attached to said second plate means to minimize vibration of said recording medium within said cassette holder.

8. The cassette holder as claimed in claim 7, wherein when the cassette is completely inserted in said cassette holder, said first resilient means presses on said first side of said surface of the cassette at a given distance in a direction of cassette insertion from where said second resilient means presses on said second side of said surface of the cassette.

9. The cassette holder as claimed in claim 8, wherein each of said first and second resilient means comprises:
   a leaf spring attached at a first end to said second plate means, for applying a force to said surface of the cassette; and
   a pressing roller attached to a second end of said leaf spring, for contacting said surface of the cassette.

10. The cassette holder as claimed in claim 9, wherein said upper plate means comprises:
   first plate means for providing said guide to the cassette, and for supporting said first resilient means; and
   second plate means for providing said upper guide to the cassette, and for supporting said second resilient means.

11. A cassette holder of a tape recorder, for receiving and ejecting a cassette having a surface with a first and a second side and having a front side for exposing a recording medium facing a direction of insertion of the cassette into the cassette holder, said cassette holder comprising:
   lower plate means for supporting the cassette;
   upper plate means for providing an upper guide for the cassette;
   a first leaf spring attached at a first end to said upper plate means, for providing pressure to said first side of said surface of the cassette;
   a first pressing roller attached to a second end of said first leaf spring, for contacting said surface of the cassette to form a first contact point with said surface;
   a second leaf spring attached at a first end to said upper plate means, for providing pressure to a second side of said surface of the cassette; and
   a second pressing roller attached to a second end of said second leaf spring, for contacting said surface of the cassette to form a second contact point with said surface, spaced apart by a fixed distance along said inserting direction of the cassette from said first contact point, said first pressing roller and said second pressing roller creating said first contact point and said second contact point to minimize vibration of said recording medium within said cassette holder.

* * * * *

UNITED STATES PATENT AND TRADEMARK OFFICE
CERTIFICATE OF CORRECTION

PATENT NO. : 5,323,281
DATED : 21 June 1994
INVENTOR(S) : Byung- Yeob Park

It is certified that error appears in the above-indentified patent and that said Letters Patent is hereby corrected as shown below:

Column 2, Line 34     After "In" delete "the";

Line 53     Delete "θ"; After "angle" Insert --θ--;

Column 3, Line 5     After "10" insert --,--;

Line 26     After "cassette" insert --40,--:

Signed and Sealed this

Nineteenth Day of November, 1996

Attest:

BRUCE LEHMAN

Attesting Officer     Commissioner of Patents and Trademarks